United States Patent Office 2,895,431
Patented July 21, 1959

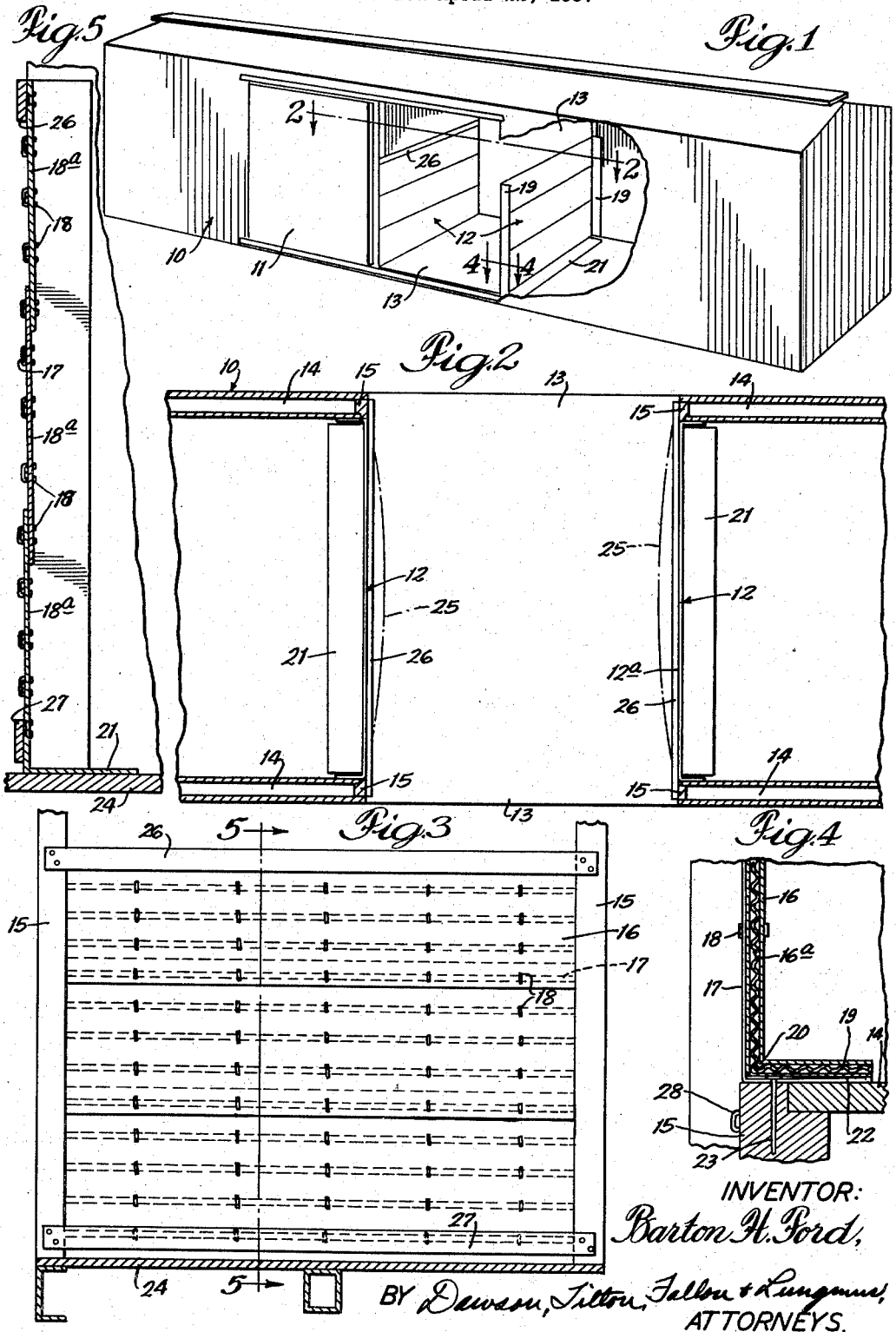

2,895,431

FREIGHT CAR BULKHEAD

Barton H. Ford, Omaha, Nebr., assignor, by mesne assignments, to Ford Grain Door Company, Omaha, Nebr., a corporation of Nebraska Application April 22, 1957, Serial No. 654,164

2 Claims. (Cl. 105—369)

This invention relates to a bulkhead for a freight car, and more particularly, for a freight car used for carrying granular material.

In the transportation of grain in a freight car it has been considered necessary to provide temporary closures or abutments to confine the grain to the car. Generally, these have taken the form of temporary closures for the side openings or doors of a railroad car. See, for example, Patent No. 2,599,443, issued June 3, 1952.

In many instances it is desirable to provide a partition or closure for something less than the entire freight car. This is particularly true where the load of granular material shipped is less than a carload. In such a case it would be desirable to provide a transverse bulkhead which not only permits the loading of a portion of the car with granular material, but also permits the trucks and other vehicles to conveniently enter the car doorways for loading and unloading.

Where conventional materials of construction such as wood planks have been used for such bulkheads, a number of problems have arisen. For one thing, the care in their fabrication and installation is great since they must prove effective seals for the grain they shore up. Granular particles being small can find their way out of any gap that is permitted to exist in a bulkhead. Thus, the bulkheads have been characterized by substantial reinforcements, usually at the points of attachment to the freight car. After a number of bulkheads have been attached to a freight car, the heavy wear occasioned by use of strong securing means tends to weaken the car framing structure. This weakening ultimately results in expensive repairs.

It is therefore a general object of this invention to provide a freight car bulkhead structure that overcomes the disadvantages and problems set forth above. Another object is to provide a disposable bulkhead for a freight car. Still another object is to provide a freight car bulkhead that provides good seals with the wall and floor above the car. Yet another object is to provide a freight car bulkhead in which seals with the wall and floor of the freight car are achieved through the employment of the pressure of grain confined by such bulkhead. A further object is to provide a freight car bulkhead which is attachable to a freight car without extensive carpentry work. Other objects and advantages of this invention can be seen as this specification proceeds.

This invention will be explained, in an illustrated embodiment in conjunction with the accompanying drawing, in which—

Fig. 1 is a fragmentary perspective view of a freight car partially cut away to show a pair of bulkhead structures mounted therein; Fig. 2 is an enlarged view taken along the line 2—2 of Fig. 1; Fig. 3 is a front view of a bulkhead incorporating some of the teachings of this invention shown installed in a part of the framework of a freight car; Fig. 4 is an enlarged view taken along the line 4—4 of Fig. 1; and Fig. 5 is a view taken along the line 5—5 of Fig. 3.

In the illustration given the numeral 10 generally denotes a freight car. In Fig. 1 a conventional freight car is shown in outline and without trucks or other undercarriage since the latter is not considered essential for the understanding of this invention. Freight car 10 is provided with conventional sliding storm doors 11, shown in Fig. 1 in an open position.

Transverse bulkheads generally designated 12 are shown mounted in place athwart car 10 approximately in line with the side framing of the doorways 13 of car 10. This mounting can be better appreciated from a consideration of Fig. 2. There freight car 10 is shown in enlarged fragmentary view and is seen to include side walls 14. Side walls 14 terminate at points near the longitudinal center of car 10 to provide doorways 13. Doorways 13 are partially defined by vertical framing members 15.

The bulkhead of this invention in the illustration thereof set forth here is best seen in Fig. 3. Bulkhead 12 is seen to extend across car 10 between laterally opposed framing members 15. In one embodiment bulkhead 12 includes a sheet or panel 16 of cellulosic material, preferably corrugated paper board. When corrugated paper board is embodied for the panel 16, I prefer to have the flutes 16ª thereof disposed horizontally as can be seen from Fig. 4. Secured to one side of the cellulosic sheet 16 is a plurality of metal straps 17 arranged in parallel spaced relation and extending across the width of sheet 16. Straps 17 are approximately of a length equal to the width of sheet 16 but are unsecured at their ends. In the illustration given straps 17 are secured to sheet 16 by staples 18. Alternative means for securing straps 17 to sheet 16 will be apparent to those skilled in the art.

Sheet 16 is provided with a pair of side flaps 19. Flaps 19 are preferably provided integral with sheet 16 and are formed by provided lineal creases in sheet 16. Where corrugated paper board is employed as sheet 16, such as is shown in Fig. 4, a vertical scoring such as indicated by the numeral 20 can be conveniently employed to form flap 19. Sheet 16 is additionally scored along a line near the bottom thereof to provide a bottom flap 21.

When it is desired to install bulkhead 12 in freight car 10, the unsecured ends of straps 17 may be bent inwardly about 90° as indicated by the numeral 22 in Fig. 4. Thereafter a nail 23 or other suitable fastening means can be driven through suitable openings provided in strap end 22 and into framing member 15. Thereafter the portion of the car 10 partially closed by bulkhead 12 is filled with a granular material. The material is introduced into the compartment formed by the walls, floor and bulkhead over the bulkhead which is seen in Fig. 1 to extend only part way of the height of car 10. The weight of the grain introduced behind bulkhead 12 exerts a pressure against side flaps 19 sealing them to walls 14 and against bottom flap 21 sealing it to floor 24. Thus a simple, disposable grain-type bulkhead is readily achieved. Excellent results have been achieved where side flaps 19 have not been secured to framing 15 or walls 14, contrary to the attachment shown with respect to strap ends 22. The significance of this lack of securement can be appreciated from a consideration of Fig. 2 wherein the disposition of bulkhead 12 under grain pressure is shown in a broken line. The weight of granular material confined by bulkhead 12 exerts a pressure thereagainst which tends to bow it outwardly to the disposition shown in dotted line and designated 25. When the side flaps 19 are secured to framing 15 or wall 14, the movement of the planar portion 12ª bulkhead 12 necessary to produce the bowing indicated at 25 causes side flaps 19 to gap between the points of securement. The gaps thereby produced permit grain to escape. However, by relying only upon the weight of grain to seal side flaps 19 to the side walls 14 or car 10, a uniform seal is achieved and no gaps exist. In the illustration given, a composite bulkhead has been made up of three sections. In Figs. 1 and 5 it is to be noted that three sheets 18ª have been united together in overlapping relation to provide a bulkhead of the desired height. If desired the bulkhead can be additionally secured in place through the use of headboard 26 and kickboard 27.

As an alternative way of securing strap ends 22, it is possible to insert them through the buckles 28 shown in dotted line in Fig. 4. Buckles 28 are ordinarily embodied for securing anchor lading straps but are eminently suited for securing strap ends 22. Such means of securing strap ends 22 provides the additional advantage of further reducing the carpentry work involved in providing a freight car bulkhead and the possible damage to framework 15 by having nails pounded therein.

While in the foregoing specification I have set forth specific structures in considerable detail for the purpose of illustrating embodiments of the invention, it will be understood that such structures and such details are but illustrative of the invention and that the same, and the details thereof, may be varied widely by those skilled in the art without departing from the spirit of my invention.

I claim:

1. In combination with a freight car carrying granular material, a bulkhead extending transversely across the car and cooperating with the side walls and end of the car to confine the granular material, said bulkhead comprising an elongated paper board panel having a length greater than the width of the car with the panel length disposed transversely of the car, said panel being transversely creased to provide a central portion of a length substantially equal to the width of the car with the portions outward of said central portion being oriented toward said end and providing thereby side flaps abutting the side walls of the car, a plurality of longitudinally-extending, spaced-apart, flat metal straps secured to and extending beyond the said central portion of the panel on the side thereof remote from the said end, only said straps being secured to said side walls at their ends, the connection of said straps to said side walls constituting the sole connection of said bulkhead to said side walls with said flaps abutting said side walls but unsecured thereto and providing a seal against grain leakage by virtue of said side flaps abutting said side walls and being held thereagainst in continuous sealing relation solely by the pressure of the granular material, with said bulkhead thereby being free to shift under the impact stresses applied to said central portion tending to bow the same and thereby move said side flaps.

2. The structure of claim 1 in which the portions of said straps extending beyond said central portion also extend along said flaps between said flaps and the adjacent abutting side walls in a direction toward said end of the car.

References Cited in the file of this patent

UNITED STATES PATENTS

| | | |
|---|---|---|
| 2,116,260 | Corkran | May 3, 1938 |
| 2,310,860 | Moon | Feb. 9, 1943 |
| 2,361,081 | Brandon | Oct. 24, 1944 |
| 2,462,309 | Dyke | Feb. 22, 1949 |
| 2,483,523 | Brandon et al. | Oct. 4, 1949 |
| 2,669,402 | Del Mar | Feb. 16, 1954 |